United States Patent
Colin et al.

(10) Patent No.: US 11,945,829 B2
(45) Date of Patent: Apr. 2, 2024

(54) FUNCTIONALIZED HYDROXYSILANES, SILYLATED POLYURETHANES, AND COMPOSITIONS COMPRISING SAME

(71) Applicant: BOSTIK SA, Colombes (FR)

(72) Inventors: Boris Colin, Venette (FR); Guillaume Michaud, Venette (FR); Stéphane Fouquay, Venette (FR); Frédéric Simon, Venette (FR)

(73) Assignee: Bostik SA, Colombes (FR)

( * ) Notice: Subject to any disclaimer, the term of this patent is extended or adjusted under 35 U.S.C. 154(b) by 537 days.

(21) Appl. No.: 17/292,096

(22) PCT Filed: Nov. 6, 2019

(86) PCT No.: PCT/FR2019/052621
§ 371 (c)(1),
(2) Date: May 7, 2021

(87) PCT Pub. No.: WO2020/094973
PCT Pub. Date: May 14, 2020

(65) Prior Publication Data
US 2021/0395278 A1 Dec. 23, 2021

(30) Foreign Application Priority Data
Nov. 9, 2018 (FR) ...................................... 1860358

(51) Int. Cl.
| | | |
|---|---|---|
| C08G 18/10 | (2006.01) | |
| C07F 7/18 | (2006.01) | |
| C08G 18/28 | (2006.01) | |
| C08G 18/44 | (2006.01) | |
| C08G 18/48 | (2006.01) | |
| C08G 18/75 | (2006.01) | |
| C07F 7/08 | (2006.01) | |

(52) U.S. Cl.
CPC ............ *C07F 7/1804* (2013.01); *C08G 18/10* (2013.01); *C08G 18/289* (2013.01); *C08G 18/44* (2013.01); *C08G 18/4866* (2013.01); *C08G 18/755* (2013.01); *C07F 7/081* (2013.01); *C08G 2190/00* (2013.01)

(58) Field of Classification Search
CPC ...................................... C07F 7/081
USPC ................................. 556/411, 449
See application file for complete search history.

(56) References Cited

U.S. PATENT DOCUMENTS

| | | | | | |
|---|---|---|---|---|---|
| 3,701,795 | A | * | 10/1972 | Holub et al. ......... | C07F 7/1896 524/211 |
| 4,997,965 | A | * | 3/1991 | Lohmann ............ | B01J 20/29 556/427 |
| 5,354,881 | A | * | 10/1994 | Chang ................. | C07F 7/1804 556/419 |
| 8,425,778 | B2 | * | 4/2013 | Liu ...................... | B01J 20/289 210/656 |
| 9,309,218 | B2 | * | 4/2016 | Woelfle .............. | C07C 329/04 |
| 9,617,238 | B2 | * | 4/2017 | Wölfle ................ | C07D 317/38 |
| 9,645,948 | B2 | * | 5/2017 | Noll ................... | G06F 21/6218 |
| 9,765,177 | B2 | * | 9/2017 | Kramer .............. | C08G 18/10 |
| 10,040,896 | B2 | * | 8/2018 | Nikitenko ........... | C08L 63/00 |
| 2011/0082273 | A1 | | 4/2011 | Laas et al. | |
| 2011/0253689 | A1 | * | 10/2011 | Yuan .................. | B23K 26/38 219/121.72 |
| 2015/0051365 | A1 | * | 2/2015 | Woelfle .............. | C08G 18/71 528/45 |
| 2015/0126678 | A1 | * | 5/2015 | Kramer .............. | C08G 18/10 556/419 |
| 2015/0353521 | A1 | * | 12/2015 | Wölfle ................ | C07D 317/38 549/229 |
| 2016/0090439 | A1 | * | 3/2016 | Nikitenko ........... | C08G 59/1438 523/436 |
| 2016/0145232 | A1 | * | 5/2016 | Putzien .............. | C07D 317/36 549/229 |
| 2018/0291265 | A1 | | 10/2018 | Rony et al. | |
| 2020/0299314 | A1 | * | 9/2020 | Damke ............... | C07F 7/1804 |

FOREIGN PATENT DOCUMENTS

| | | |
|---|---|---|
| CN | 102030883 A | 4/2011 |
| JP | 2004292517 A | 10/2004 |
| WO | 2011157551 A1 | 12/2011 |
| WO | 2012065879 A1 | 5/2012 |
| WO | 2013092011 A1 | 6/2013 |

OTHER PUBLICATIONS

ISA/EP; International Search Report and Written Opinion for International Patent Application No. PCT/FR2019/052621 dated Jan. 28, 2020, 10 pages.

* cited by examiner

*Primary Examiner* — Margaret G Moore
(74) *Attorney, Agent, or Firm* — NK Patent Law

(57) ABSTRACT

The present invention relates to a compound of formula (I):

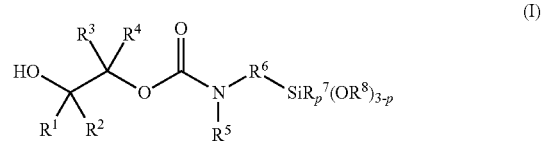

(I)

and also to the process for preparing same, and to the uses thereof. The present invention also relates to the polyurethanes obtained from the compounds of formula (I), and also to the uses of said polyurethanes.

20 Claims, No Drawings

FUNCTIONALIZED HYDROXYSILANES, SILYLATED POLYURETHANES, AND COMPOSITIONS COMPRISING SAME

CROSS-REFERENCE TO RELATED APPLICATIONS

This application is a U.S. National Stage application of International Patent Application No. PCT/FR2019/052621, filed on Nov. 6, 2019, which claims the benefit of French Patent Application No. 1860358, filed on Nov. 9, 2018.

FIELD OF THE INVENTION

The present invention relates to a functionalized hydroxysilane, and also to the process for preparing same.

The present invention also relates to the silyl polyurethanes obtained from said functionalized hydroxysilanes, and also to compositions comprising same.

TECHNOLOGICAL BACKGROUND

Silyl polymers are typically used as adhesives, mastics and coatings, for example in the aeronautical, motor vehicle or construction industry. Such polymers generally comprise end groups of alkoxysilane type connected, directly or indirectly, to a main chain of polyether or polyurethane type.

Silyl polyurethanes may be obtained from hydroxysilane derivatives comprising an alkoxysilane function. However, hydroxysilanes typically have stability problems notably on account of the possible trans-alkoxylation between the hydroxyl function and the alkoxysilane function of the hydroxysilane. This side reaction may lead to oligomeric byproducts by intramolecular and/or intermolecular reaction, which may affect the crosslinking properties of the silyl polymers, leading to reduced mechanical properties.

In addition, silyl polyurethanes typically have a high viscosity, which makes them more difficult to handle and to use.

There is thus a need for novel hydroxysilane derivatives which can advantageously solve at least one of the abovementioned drawbacks.

There is also a need for novel silyl polyurethanes which do not have at least one of the abovementioned drawbacks.

DESCRIPTION OF THE INVENTION

In the present patent application, unless otherwise indicated:
- the amounts expressed in percentage form correspond to weight/weight percentages;
- the hydroxyl number of an alcoholic compound represents the number of hydroxyl functions per gram of product, and is expressed in the form of the equivalent number of milligrams of potassium hydroxide (KOH) used in the assay of the hydroxyl functions, per gram of product;
- the viscosity measurement at 23° C. (or at 100° C.) may be performed using a Brookfield viscometer according to the standard ISO 2555. Typically, the measurement taken at 23° C. (or at 100° C.) may be performed using a Brookfield RVT viscometer with a spindle suitable for the viscosity range and at a rotational speed of 20 revolutions per minute (rpm);
- the number-average molecular masses (Mn) of the polyols, expressed in g/mol, are calculated from their hydroxyl numbers and from their functionalities.

A. Compounds

The present invention relates to a compound of formula (I):

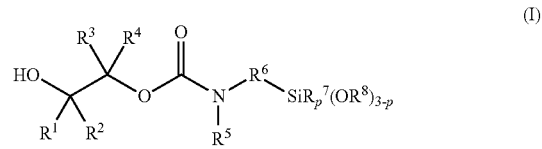

in which:
$R^1$, $R^2$, $R^3$ and $R^4$ are each, independently of each other, chosen from the group consisting of: H; a linear or branched alkyl group comprising from 1 to 20 carbon atoms; and a group —C(O)—X—$R^9$ in which:
X represents an oxygen atom or a radical $NR^{10}$;
$R^9$ is chosen from the group consisting of: a linear or branched, aliphatic or cyclic alkyl group comprising from 1 to 60 carbon atoms, preferably from 1 to 20 carbon atoms, preferentially from 1 to 12 carbon atoms, said alkyl group possibly being interrupted with one or more heteroatoms chosen from O and S, said alkyl group possibly comprising one or more unsaturations; an aryl group comprising from 6 to 24 carbon atoms, preferably from 6 to 12 carbon atoms; and an arylalkyl group in which the alkyl group comprises from 1 to 12 carbon atoms;
$R^{10}$ is chosen from the group consisting of: a hydrogen atom, a linear or branched, aliphatic or cyclic alkyl group comprising from 1 to 60 carbon atoms, preferably from 1 to 20 carbon atoms, preferentially from 1 to 12 carbon atoms, said alkyl group possibly being interrupted with one or more heteroatoms chosen from O and S, said alkyl group possibly comprising one or more unsaturations; an aryl group comprising from 6 to 24 carbon atoms, preferably from 6 to 12 carbon atoms; and an arylalkyl group in which the alkyl group comprises from 1 to 12 carbon atoms;
$R^5$ represents a hydrogen atom, a linear or branched, cyclic or aliphatic alkyl radical comprising from 1 to 20 carbon atoms, preferably from 1 to 12 carbon atoms, or a radical —$R^6$—$SiR^7_p(OR^8)_{3-p}$;
$R^6$ represents a linear or branched, cyclic or aliphatic alkylene radical comprising from 1 to 12 carbon atoms, preferably from 1 to 3 carbon atoms;
$R^7$ represents a linear or branched, cyclic or aliphatic alkyl radical comprising from 1 to 12 carbon atoms, preferably from 1 to 5 carbon atoms;
each $R^8$ represents, independently of each other, a linear or branched, cyclic or aliphatic alkyl radical comprising from 1 to 12 carbon atoms, preferably from 1 to 5 carbon atoms; or two radicals $R^8$ may together form a ring comprising from 3 to 12 carbon atoms; and
p represents 0, 1 or 2;
on condition that a radical from among the radicals $R^1$, $R^2$, $R^3$ or $R^4$ represents a group —C(O)—X—$R^9$.

Preferably, the compounds of formula (I) above are those for which:
$R^1$=$R^2$=$R^3$=H and $R^4$ represents a group —C(O)—X—$R^9$ in which X and $R^9$ are as defined previously; or
$R^1$=$R^4$=$R^3$=H and $R^2$ represents a group —C(O)—X—$R^9$ in which X and $R^9$ are as defined previously.

The compounds of formula (I) may be chosen from the compounds of formulae (I-1) and (I-2) below:

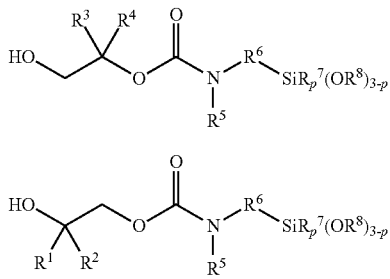

(I-1)

(I-2)

in which:
- $R^3$, $R^4$, $R^5$, $R^6$, $R^7$, $R^8$ and p are as defined above,
- a radical from among $R^3$ and $R^4$ represents a group —C(O)—X—$R^9$,
- a radical from among $R^1$ and $R^2$ represents a group —C(O)—X—$R^9$,
- X represents an oxygen atom or a radical $NR^{10}$,
- $R^9$ is chosen from the group consisting of: a linear or branched, aliphatic or cyclic alkyl group comprising from 1 to 60 carbon atoms, preferably from 1 to 20 carbon atoms, preferentially from 1 to 12 carbon atoms, said alkyl group possibly being interrupted with one or more heteroatoms chosen from O and S, said alkyl group possibly comprising one or more unsaturations; an aryl group comprising from 6 to 24 carbon atoms, preferably from 6 to 12 carbon atoms; and an arylalkyl group in which the alkyl group comprises from 1 to 12 carbon atoms;
- $R^{10}$ is chosen from the group consisting of: a hydrogen atom, a linear or branched, aliphatic or cyclic alkyl group comprising from 1 to 60 carbon atoms, preferably from 1 to 20 carbon atoms, preferentially from 1 to 12 carbon atoms, said alkyl group possibly being interrupted with one or more heteroatoms chosen from O and S, said alkyl group possibly comprising one or more unsaturations; an aryl group comprising from 6 to 24 carbon atoms, preferably from 6 to 12 carbon atoms; and an arylalkyl group in which the alkyl group comprises from 1 to 12 carbon atoms.

The compounds of formula (I-1) are notably compounds of the abovementioned formula (I) in which $R^1=R^2=H$.

The compounds of formula (I-2) are notably compounds of the abovementioned formula (I) in which $R^3=R^4=H$.

Among the compounds of formula (I-1), examples that may be mentioned include:
- the compounds of formula (I-1-A) in which $R^3$, $R^4$, $R^5$, $R^6$, $R^7$, $R^8$ and p are as defined above, and a radical from among $R^3$ and $R^4$ represents a group —C(O)—O—$R^9$, $R^9$ being as defined above;

or
- the compounds of formula (I-1-B) in which $R^3$, $R^4$, $R^5$, $R^6$, $R^7$, $R^8$ and p are as defined previously, and a radical from among $R^3$ and $R^4$ represents a group —C(O)—N($R^{10}$)$R^9$, $R^9$ and $R^{10}$ being as defined previously.

Among the compounds of formula (I-2), examples that may be mentioned include:
- the compounds of formula (I-2-A) in which $R^1$, $R^2$, $R^5$, $R^6$, $R^7$, $R^8$ and p are as defined above, and a radical from among $R^1$ and $R^2$ represents a group —C(O)—O—$R^9$, $R^9$ being as defined above;

or
- the compounds of formula (I-2-B) in which $R^1$, $R^2$, $R^5$, $R^6$, $R^7$, $R^8$ and p are as defined previously, and a radical from among $R^1$ and $R^2$ represents a group —C(O)—N($R^{10}$)$R^9$, $R^9$ and $R^{10}$ being as defined previously.

According to one embodiment, the compounds of formula (I) are compounds of formula (I-3) below:

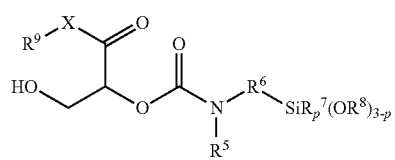

(I-3)

in which:
- X represents an oxygen atom or a radical $NR^{10}$,
- $R^9$ is chosen from the group consisting of: a linear or branched, aliphatic or cyclic alkyl group comprising from 1 to 60 carbon atoms, preferably from 1 to 20 carbon atoms, preferentially from 1 to 12 carbon atoms, said alkyl group possibly being interrupted with one or more heteroatoms chosen from O and S, said alkyl group possibly comprising one or more unsaturations; an aryl group comprising from 6 to 24 carbon atoms, preferably from 6 to 12 carbon atoms; and an arylalkyl group in which the alkyl group comprises from 1 to 12 carbon atoms;
- $R^{10}$ is chosen from the group consisting of: a hydrogen atom, a linear or branched, aliphatic or cyclic alkyl group comprising from 1 to 60 carbon atoms, preferably from 1 to 20 carbon atoms, preferentially from 1 to 12 carbon atoms, said alkyl group possibly being interrupted with one or more heteroatoms chosen from O and S, said alkyl group possibly comprising one or more unsaturations; an aryl group comprising from 6 to 24 carbon atoms, preferably from 6 to 12 carbon atoms; and an arylalkyl group in which the alkyl group comprises from 1 to 12 carbon atoms;
- $R^5$ represents a hydrogen atom, a linear or branched, cyclic or aliphatic alkyl radical comprising from 1 to 20 carbon atoms, preferably from 1 to 12 carbon atoms, or a radical —$R^6$—$SiR^7_p(OR^8)_{3-p}$;
- $R^6$ represents a linear or branched, cyclic or aliphatic alkylene radical comprising from 1 to 12 carbon atoms, preferably from 1 to 5 carbon atoms;
- $R^7$ represents a linear or branched, cyclic or aliphatic alkyl radical comprising from 1 to 12 carbon atoms, preferably from 1 to 5 carbon atoms;
- each $R^8$ represents, independently of each other, a linear or branched, cyclic or aliphatic alkyl radical comprising from 1 to 12 carbon atoms, preferably from 1 to 5 carbon atoms; or two radicals $R^8$ may together form a ring comprising from 3 to 12 carbon atoms; and
- p represents 0, 1 or 2.

According to another embodiment, the compounds of formula (I) are compounds of formula (I-4) below:

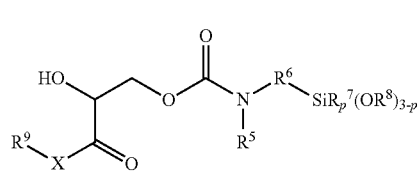

(I-4)

in which:
X represents an oxygen atom or a radical $NR^{10}$,
$R^9$ is chosen from the group consisting of: a linear or branched, aliphatic or cyclic alkyl group comprising from 1 to 60 carbon atoms, preferably from 1 to 20 carbon atoms, preferentially from 1 to 12 carbon atoms, said alkyl group possibly being interrupted with one or more heteroatoms chosen from O and S, said alkyl group possibly comprising one or more unsaturations; an aryl group comprising from 6 to 24 carbon atoms, preferably from 6 to 12 carbon atoms; and an arylalkyl group in which the alkyl group comprises from 1 to 12 carbon atoms;
$R^{10}$ is chosen from the group consisting of: a hydrogen atom, a linear or branched, aliphatic or cyclic alkyl group comprising from 1 to 60 carbon atoms, preferably from 1 to 20 carbon atoms, preferentially from 1 to 12 carbon atoms, said alkyl group possibly being interrupted with one or more heteroatoms chosen from O and S, said alkyl group possibly comprising one or more unsaturations; an aryl group comprising from 6 to 24 carbon atoms, preferably from 6 to 12 carbon atoms; and an arylalkyl group in which the alkyl group comprises from 1 to 12 carbon atoms;
$R^5$ represents a hydrogen atom, a linear or branched, cyclic or aliphatic alkyl radical comprising from 1 to 20 carbon atoms, preferably from 1 to 12 carbon atoms, or a radical $-R^6-SiR^7_p(OR^8)_{3-p}$;
$R^6$ represents a linear or branched, cyclic or aliphatic alkylene radical comprising from 1 to 12 carbon atoms, preferably from 1 to 5 carbon atoms;
$R^7$ represents a linear or branched, cyclic or aliphatic alkyl radical comprising from 1 to 12 carbon atoms, preferably from 1 to 5 carbon atoms;
each $R^8$ represents, independently of each other, a linear or branched, cyclic or aliphatic alkyl radical comprising from 1 to 12 carbon atoms, preferably from 1 to 5 carbon atoms; or two radicals $R^8$ may together form a ring comprising from 3 to 12 carbon atoms; and
p represents 0, 1 or 2.

According to one embodiment, the compounds of the abovementioned formulae (I), (I-1), (I-2), (I-3) and (I-4) are those for which:
p=0; and/or
$R^8$=methyl; and/or
$R^6$=propylene; and/or
$R^5$=H or butyl.

In particular, the compounds of the abovementioned formulae (I), (I-1), (I-2), (I-3) and (I-4) are those for which:
p=0; and
$R^8$=methyl; and
$R^6$=propylene; and
$R^5$=H or butyl.

According to one embodiment, in the compounds of the abovementioned formulae (I), (I-1), (I-2), (I-3) and (I-4), the group $R^9$ represents a linear or branched, aliphatic or cyclic alkyl group comprising from 1 to 60 carbon atoms, preferably from 1 to 20 carbon atoms, preferentially from 1 to 12 carbon atoms, said alkyl group possibly being interrupted with one or more heteroatoms chosen from O and S, said alkyl group possibly comprising one or more unsaturations.

Preferably, in the compounds of the abovementioned formulae (I), (I-1), (I-2), (I-3) and (I-4), the group $R^9$ represents:
a linear alkyl group comprising from 1 to 12 carbon atoms, preferably from 1 to 5 carbon atoms, preferentially a butyl group; or
a branched alkyl group comprising from 1 to 12 carbon atoms, preferably from 5 to 12 carbon atoms, preferably a $-CH_2-CH(CH_2CH_3)-(CH_2)_3-CH_3$ group; or
a group of formula $-(CH(Me)-CH_2-O)_n-(CH_2)_m-CH_3$, in which m and n each represent an integer ranging from 1 to 5, preferably 1, 2 or 3.

According to one embodiment, in the compounds of the abovementioned formulae (I), (I-1), (I-2), (I-3) and (I-4), the group $R^{16}$ represents a linear or branched, aliphatic or cyclic alkyl group comprising from 1 to 60 carbon atoms, preferably from 1 to 20 carbon atoms, preferentially from 1 to 12 carbon atoms, said alkyl group possibly being interrupted with one or more heteroatoms chosen from O and S, said alkyl group possibly comprising one or more unsaturations.

Preferably, the group $R^{10}$ represents a linear alkyl radical comprising from 1 to 12 carbon atoms, preferentially from 1 to 5 carbon atoms, the group $R^{10}$ advantageously being a methyl.

According to a preferred embodiment, the compounds of formula (I) are chosen from the following compounds:

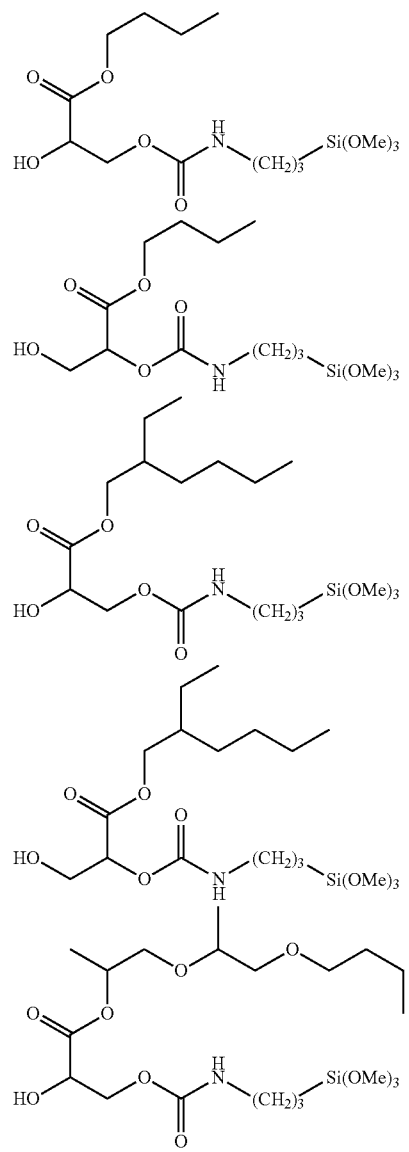

-continued

[Chemical structures shown]

B. Process for Preparing the Compounds

The present invention also relates to a process for preparing a compound of the abovementioned formula (I), comprising the reaction between a compound of formula (II):

$$R^5\text{-NH-}R^6\text{-SiR}_p^7(OR^8)_{3-p} \quad (II)$$

in which $R^5$, $R^6$, $R^7$, $R^8$ and p are as defined previously; with a compound of formula (III) below:

[Structure of formula (III) with $R^1$, $R^2$, $R^3$, $R^4$ substituents on a cyclic carbonate]

in which $R^1$, $R^2$, $R^3$ and $R^4$ are as defined previously, a radical from among the radicals $R^1$, $R^2$, $R^3$ and $R^4$ representing a group —C(O)—X—$R^9$ with X and $R^9$ being as defined previously.

The compounds of formula (III) may be prepared conventionally from corresponding epoxides, as disclosed, for example, in WO 2011/157551, WO 2012/065879 and WO 2013/092011.

Among the compounds of formula (II), mention may be made, for example, of the following compounds:
  4-aminobutyltriethoxysilane;
  3-aminopropyltris(methoxyethoxyethoxy)silane;
  N-(n-butyl)-3-aminopropyltrimethoxysilane;
  3-aminopropyldimethylethoxysilane;
  3-aminopropylmethyldiethoxysilane;
  3-aminopropyldiisopropylethoxysilane;
  3-aminopropyltriethoxysilane;
  3-aminopropyltrimethoxysilane;
  3-N-methylaminopropyltriethoxysilane;
  ethyl N-[3-(trimethoxysilyl)propyl] aspartate;
  ethyl N-[3-(trimethoxysilyl)propyl]-2-aminomethylsuccinate;
  ethyl N-[3-(trimethoxysilyl)propyl]-2-aminomethylmalonate;
  bis[3-(trimethoxysilyl)propyl]amine.

Preferably, the compounds of formula (II) are N-(n-butyl)-3-aminopropyltrimethoxysilane and 3-aminopropyltrimethoxysilane.

The compounds of formula (III) may be chosen from the compounds of formula (III-1) below:

[Structure of formula (III-1): cyclic carbonate with $R^9$-X-C(O)- substituent]

in which X and $R^9$ are as defined previously.

Among the compounds of formula (III), mention may be made, for example, of the following compounds:

[Structure (IIIa)]

[Structure (IIIb)]

-continued

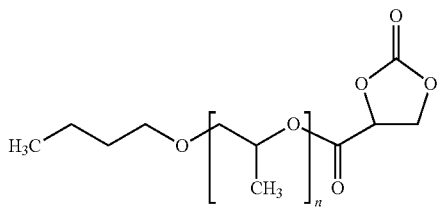
(IIIc)

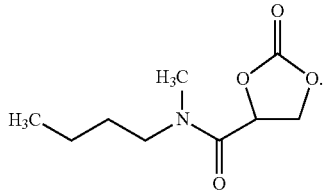
(IIId)

with n = 2

The reaction may be performed under anhydrous conditions.

The reaction may be performed at a temperature ranging from 15° C. to 100° C., preferably from 20° C. to 95° C., preferentially at room temperature (23° C.) or at 90° C.

The reaction may be performed in the presence of solvent, for instance toluene, ethyl acetate, tetrahydrofuran, acetone, butanone, or mixtures thereof.

Preferably, the reaction is performed in a compound (II)/compound (III) mole ratio ranging from 1.2 to 0.8, preferably 1.1 to 0.9; the ratio is preferentially 1.

The reaction time may vary notably depending on the nature of the reagents used, their concentrations and the reaction temperature. The reaction may be monitored by infrared spectroscopy, by monitoring the disappearance of the IR band for the carbonyl of the carbonate, or by $^1$H and/or $^{13}$C NMR.

At the end of the reaction, the compound of formula (I) may be recovered, notably by evaporating off the reaction solvent, and optionally subjected to a purification step.

C. Composition C

The present invention also relates to a composition C comprising two compounds of different formula (I), formula (I) being as defined previously.

According to one embodiment, the abovementioned composition C comprises:

a compound of formula (I-1):

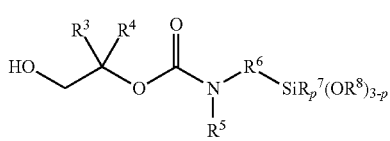
(I-1)

and
a compound of formula (I-2):

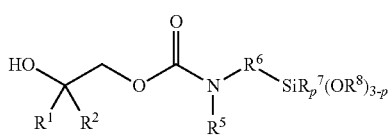
(I-2)

in which:
$R^1$, $R^2$, $R^3$ and $R^4$ are each, independently of each other, chosen from the group consisting of: H; a linear or branched alkyl group comprising from 1 to 20 carbon atoms; and a group —C(O)—X—$R^9$ in which:
X represents an oxygen atom or a radical $NR^{10}$;
$R^9$ is chosen from the group consisting of: a linear or branched, aliphatic or cyclic alkyl group comprising from 1 to 60 carbon atoms, preferably from 1 to 20 carbon atoms, preferentially from 1 to 12 carbon atoms, said alkyl group possibly being interrupted with one or more heteroatoms chosen from O and S, said alkyl group possibly comprising one or more unsaturations; an aryl group comprising from 6 to 24 carbon atoms, preferably from 6 to 12 carbon atoms; and an arylalkyl group in which the alkyl group comprises from 1 to 12 carbon atoms;
$R^{10}$ is chosen from the group consisting of: a hydrogen atom, a linear or branched, aliphatic or cyclic alkyl group comprising from 1 to 60 carbon atoms, preferably from 1 to 20 carbon atoms, preferentially from 1 to 12 carbon atoms, said alkyl group possibly being interrupted with one or more heteroatoms chosen from O and S, said alkyl group possibly comprising one or more unsaturations; an aryl group comprising from 6 to 24 carbon atoms, preferably from 6 to 12 carbon atoms; and an arylalkyl group in which the alkyl group comprises from 1 to 12 carbon atoms;
$R^5$ represents a hydrogen atom, a linear or branched, cyclic or aliphatic alkyl radical comprising from 1 to 20 carbon atoms, preferably from 1 to 12 carbon atoms, or a radical —$R^6$—$SiR^7_p(OR^8)_{3-p}$;
$R^6$ represents a linear or branched, cyclic or aliphatic alkylene radical comprising from 1 to 12 carbon atoms, preferably from 1 to 5 carbon atoms;
$R^7$ represents a linear or branched, cyclic or aliphatic alkyl radical comprising from 1 to 12 carbon atoms, preferably from 1 to 5 carbon atoms;
each $R^8$ represents, independently of each other, a linear or branched, cyclic or aliphatic alkyl radical comprising from 1 to 12 carbon atoms, preferably from 1 to 5 carbon atoms; or two radicals $R^8$ may together form a ring comprising from 3 to 12 carbon atoms; and
p represents 0, 1 or 2;
a radical from among $R^3$ and $R^4$ represents a group —C(O)—X—$R^9$; and
a radical from among $R^1$ and $R^2$ represents a group —C(O)—X—$R^9$.

Preferably, in the abovementioned composition C:
the radical $R^5$ of formula (I-1) is identical to the radical $R^5$ of formula (I-2);
the radical $R^6$ of formula (I-1) is identical to the radical $R^6$ of formula (I-2);
the radical $R^7$ of formula (I-1) is identical to the radical $R^7$ of formula (I-2);
the radical $R^8$ of formula (I-1) is identical to the radical $R^8$ of formula (I-2);
p of formula (I-1) is identical to the radical $R^8$ of formula (I-2); and
the radical $R^1$ (or $R^2$) of formula (I-2) is identical to the radical $R^3$ (or, respectively, $R^4$) of formula (I-1).

In the abovementioned composition C, the compound of formula (I-1)/compound of formula (I-2) mole ratio may range from 1/100 to 100/1, preferably from 10/90 to 90/10, preferentially from 20/80 to 80/20, for example from 30/70 to 70/30.

According to another embodiment, composition C according to the invention comprises:

a compound of formula (I-3):

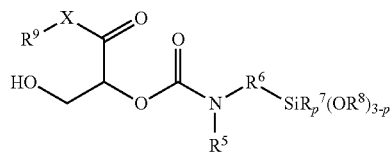

(I-3)

and a compound of formula (I-4):

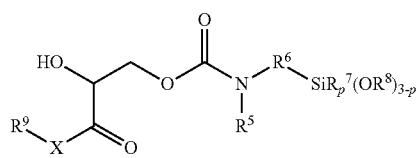

(I-4)

in which:
- X represents an oxygen atom or a radical $NR^{10}$;
- $R^9$ is chosen from the group consisting of: a linear or branched, aliphatic or cyclic alkyl group comprising from 1 to 60 carbon atoms, preferably from 1 to 20 carbon atoms, preferentially from 1 to 12 carbon atoms, said alkyl group possibly being interrupted with one or more heteroatoms chosen from O and S, said alkyl group possibly comprising one or more unsaturations; an aryl group comprising from 6 to 24 carbon atoms, preferably from 6 to 12 carbon atoms; and an arylalkyl group in which the alkyl group comprises from 1 to 12 carbon atoms;
- $R^{10}$ is chosen from the group consisting of: a hydrogen atom, a linear or branched, aliphatic or cyclic alkyl group comprising from 1 to 60 carbon atoms, preferably from 1 to 20 carbon atoms, preferentially from 1 to 12 carbon atoms, said alkyl group possibly being interrupted with one or more heteroatoms chosen from O and S, said alkyl group possibly comprising one or more unsaturations; an aryl group comprising from 6 to 24 carbon atoms, preferably from 6 to 12 carbon atoms; and an arylalkyl group in which the alkyl group comprises from 1 to 12 carbon atoms;
- $R^5$ represents a hydrogen atom, a linear or branched, cyclic or aliphatic alkyl radical comprising from 1 to 20 carbon atoms, preferably from 1 to 12 carbon atoms, or a radical $—R^6—SiR^7_p(OR^8)_{3-p}$;
- $R^6$ represents a linear or branched, cyclic or aliphatic alkylene radical comprising from 1 to 12 carbon atoms, preferably from 1 to 5 carbon atoms;
- $R^7$ represents a linear or branched, cyclic or aliphatic alkyl radical comprising from 1 to 12 carbon atoms, preferably from 1 to 5 carbon atoms;
- each $R^8$ represents, independently of each other, a linear or branched, cyclic or aliphatic alkyl radical comprising from 1 to 12 carbon atoms, preferably from 1 to 5 carbon atoms; or two radicals $R^8$ may together form a ring comprising from 3 to 12 carbon atoms; and
- p represents 0, 1 or 2.

Preferably, in the abovementioned composition C:
- the radical $R^5$ of formula (I-3) is identical to the radical $R^5$ of formula (I-4);
- the radical $R^6$ of formula (I-3) is identical to the radical $R^6$ of formula (I-4);
- the radical $R^7$ of formula (I-3) is identical to the radical $R^7$ of formula (I-4);
- the radical $R^8$ of formula (I-3) is identical to the radical $R^8$ of formula (I-4);
- the radical X of formula (I-3) is identical to the radical X of formula (I-4);
- the radical $R^9$ of formula (I-3) is identical to the radical $R^9$ of formula (I-4); and
- p of formula (I-3) is identical to the radical $R^8$ of formula (I-4).

In the abovementioned composition C, the compound of formula (I-3)/compound of formula (I-4) mole ratio may range from 1/100 to 100/1, preferably from 10/90 to 90/10, preferentially from 20/80 to 80/20, for example from 30/70 to 70/30.

Preferably, composition C is chosen from the following compositions:

composition C1 comprising:

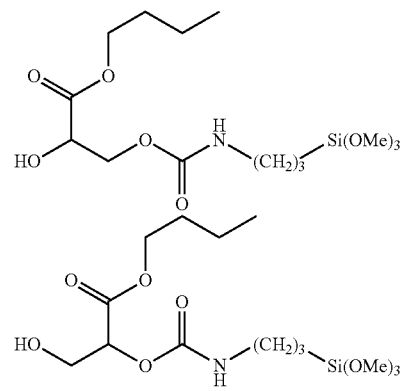

composition C2 comprising:

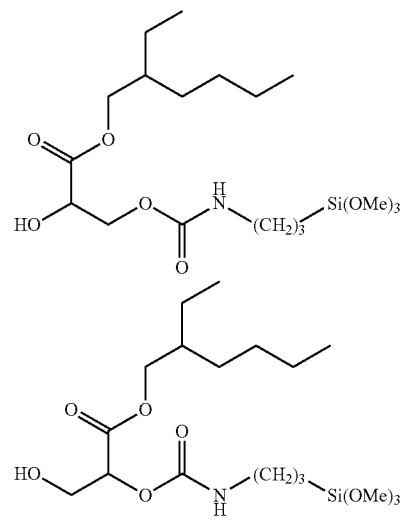

composition C3 comprising:

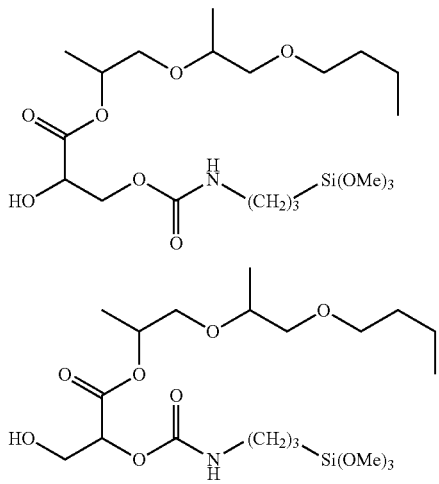

composition C4 comprising:

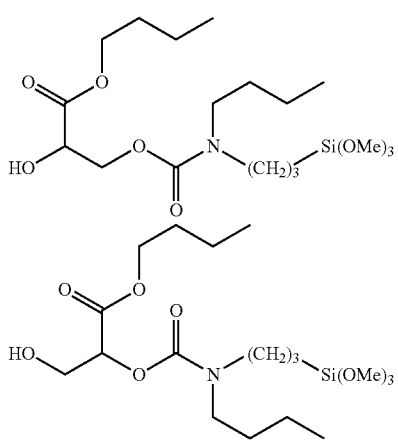

composition C5 comprising:

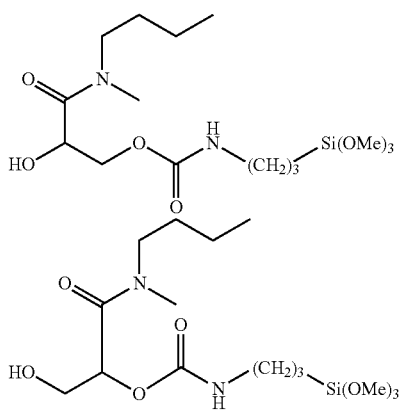

The present invention also relates to the use of a compound of formula (I) as defined previously or of the abovementioned composition C for preparing a polymer.

D. Polymer

The present invention also relates to a polyurethane P obtained via a process comprising a step of reaction between:
at least one, preferably at least two, compound(s) of formula (I) as defined above, and
a prepolymer, preferably a polyurethane prepolymer, of formula (IV) below:

$$B\text{---}[NCO]_t \quad (IV)$$

with t representing an integer or non-integer number which may range from 2 to 4, and B representing a multivalent organic radical.

Preferably, the polyurethane P according to the invention is obtained via a process comprising a step of reaction between:
a compound of the abovementioned formula (I-3),
a compound of the abovementioned formula (I-4), and
a prepolymer of the abovementioned formula (IV);
preferably, the compounds of formulae (I-3) and (I-4) are such that:
the radical $R^5$ of formula (I-3) is identical to the radical $R^5$ of formula (I-4);
the radical $R^6$ of formula (I-3) is identical to the radical $R^6$ of formula (I-4);
the radical $R^7$ of formula (I-3) is identical to the radical $R^7$ of formula (I-4);
the radical $R^8$ of formula (I-3) is identical to the radical $R^8$ of formula (I-4);
the radical X of formula (I-3) is identical to the radical X of formula (I-4);
the radical $R^9$ of formula (I-3) is identical to the radical $R^9$ of formula (I-4); and
p of formula (I-3) is identical to the radical $R^8$ of formula (I-4).

The prepolymer of formula (IV) may be obtained via any method known to those skilled in the art for the preparation of a prepolymer terminated with —NCO groups.

According to one embodiment, the abovementioned prepolymer of formula (IV) is a polyurethane obtained by a polyaddition reaction:
a) of at least one polyisocyanate preferably chosen from diisocyanates, triisocyanates, and mixtures thereof;
b) with at least one polyol, preferably chosen from polyether polyols, polycarbonate polyols, polyester polyols, and mixtures thereof;
in amounts such that the NCO/OH mole ratio (r1) is strictly greater than 1, preferably ranges from 1.2 to 2.

According to one embodiment, the polyurethane P according to the invention is prepared via a process comprising the following steps:
E1) the preparation of a polyurethane prepolymer bearing —NCO end groups of the abovementioned formula (IV) via a polyaddition reaction:
i) of at least one polyisocyanate preferably chosen from diisocyanates, triisocyanates, and mixtures thereof;
ii) with at least one polyol, preferably chosen from polyether polyols, polycarbonate polyols, polyester polyols, and mixtures thereof;
in amounts such that the NCO/OH mole ratio (r1) is strictly greater than 1;
and
E2) reaction of the product formed on conclusion of step E1) with at least one, preferably two, compound(s) of formula (I) as defined previously, in particular in amounts such that the NCO/OH mole ratio (r2) is preferably between 1.3 and 5.

In the context of the invention, and unless otherwise mentioned, (r1) is the NCO/OH mole ratio corresponding to the mole ratio of the number of isocyanate groups (NCO) to the number of hydroxyl groups (OH) borne by all of the polyisocyanate(s) and polyol(s) present in the reaction medium of step E1).

In the context of the invention, and unless otherwise mentioned, (r2) is the NCO/OH mole ratio corresponding to the mole ratio of the number of isocyanate groups to the number of hydroxyl groups borne, respectively, by all of the isocyanate(s) (as notably regards the polyurethane prepolymer bearing NCO end groups and optionally the polyisocyanate(s) which have not reacted at the end of step E1)), and compound(s) of formula (I) present in the reaction medium of step E2).

When the polyurethane bearing NCO end groups is obtained during step E1) from a mixture of polyisocyanates or of several polyisocyanates added successively, the calculation of the ratio (r1) takes into account firstly the NCO groups borne by all of the polyisocyanates present in the reaction medium of step E1), and secondly the OH groups borne by the polyol(s) present in the reaction medium of step E1).

During step E1), the polyaddition reaction is performed at a temperature preferably below 95° C., and preferably under anhydrous conditions.

Step E1)

The polyol(s) that may be used to prepare the prepolymer of the abovementioned formula (IV) used according to the invention may be chosen from those for which the number-average molecular mass (Mn) ranges from 300 to 20 000 g/mol, preferably from 400 to 15 000 g/mol and preferentially from 500 to 12 000 g/mol.

Preferably, their hydroxyl functionality ranges from 2 to 3. The hydroxyl functionality is the mean number of hydroxyl functions per mole of polyol.

The polyol(s) that may be used according to the invention may have a (mean) hydroxyl number (IOH) ranging from 9 to 570 milligrams of KOH per gram of polyol (mg KOH/g), preferably from 35 to 430 mg KOH/g, more preferably from 55 to 340 mg KOH/g.

The polyol(s) may be chosen from polyether polyols, polyester polyols, polycarbonate polyols, and mixtures thereof. Preferably, step E1) is performed with a polyether polyol.

The polyether polyol(s) that may be used according to the invention are preferably chosen from polyoxyalkylene polyols, the linear or branched alkylene portion of which comprises from 2 to 4 carbon atoms, more preferentially from 2 to 3 carbon atoms.

More preferentially, the polyether polyol(s) that may be used according to the invention are preferably chosen from polyoxyalkylene diols or polyoxyalkylene triols, the linear or branched alkylene portion of which comprises from 1 to 4 carbon atoms, more preferentially from 2 to 3 carbon atoms.

As examples of polyoxyalkylene diols or triols that may be used according to the invention, mention may be made of:
  polyoxypropylene diols or triols (also denoted by polypropylene glycol (PPG) diols or triols) having a number-average molecular mass (Mn) ranging from 300 to 20 000 g/mol;
  polyoxyethylene diols or triols (also denoted by polyethylene glycol (PEG) diols or triols) having a number-average molecular mass (Mn) ranging from 300 to 15 000 g/mol;
  polyoxybutylene diols or triols (also denoted by (PBG) diols or triols) having a number-average molecular mass ranging from 300 to 20 000 g/mol;
  polytetramethylene diols or triols (also denoted by polyTHF or PTMEG) having a number-average molecular mass (Mn) ranging from 250 to 4000 g/mol;
  diol or triol copolymers or terpolymers based on ethylene oxide, propylene oxide and/or butylene oxide having a number-average molecular mass (Mn) ranging from 300 to 20 000 g/mol;
  and mixtures thereof.

The abovementioned polyether polyols may be prepared conventionally and are widely available commercially. They may be obtained by polymerization of the corresponding alkylene oxide in the presence of a basic catalyst (for example potassium hydroxide) or a catalyst based on a double metal/cyanide complex.

Among the polypropylene glycols with a hydroxyl functionality equal to 2, mention may be made of:
  Voranol® EP 1900: difunctional PPG with a number-average molecular mass of about 4008 g/mol, and a hydroxyl number $I_{OH}$ equal to 28 mg KOH/g;
  Acclaim® 8200: difunctional PPG with a number-average molecular mass of 8016 g/mol, and a hydroxyl number $I_{OH}$ equal to 14 mg KOH/g;
  Acclaim® 12200: difunctional PPG with a number-average molecular mass of 11 222 g/mol, and a hydroxyl number $I_{OH}$ equal to 10 mg KOH/g;
  Acclaim® 18200: difunctional PPG with a number-average molecular mass of 17 265 g/mol, and a hydroxyl number $I_{OH}$ equal to 6.5 mg KOH/g.

Among the polypropylene glycols with a hydroxyl functionality equal to 3, mention may be made of:
  Voranol® CP 755: trifunctional PPG with a number-average molecular mass of about 710 g/mol, and a hydroxyl number $I_{OH}$ equal to 237 mg KOH/g;
  Voranol® CP 3355: trifunctional PPG with a number-average molecular mass of about 3544 g/mol, and a hydroxyl number $I_{OH}$ equal to 47.5 mg KOH/g;
  Acclaim® 6300: trifunctional PPG with a number-average molecular mass of about 5948 g/mol, and a hydroxyl number $I_{OH}$ equal to 28.3 mg KOH/g.

Among the polytetramethylene glycols with a hydroxyl functionality equal to 2, mention may be made of:
  Terathane® PTMEG 250: difunctional PolyTHF with a number-average molecular mass of about 4008 g/mol, and a hydroxyl number $I_{OH}$ ranging from 230 to 270 mg KOH/g;
  Terathane® PTMEG 2900: difunctional PolyTHF with a number-average molecular mass of about 4008 g/mol, and a hydroxyl number $I_{OH}$ ranging from 37.7 to 39.7 mg KOH/g.

In the context of the invention, the term "hydroxyl functionality of a polyether polyol" means the mean number of hydroxyl functions per mole of polyether polyol.

The polyester polyols may be chosen from polyester diols and polyester triols, and preferably from polyester diols.

Examples of polyester diols or triols that may be mentioned include:
  Realkyd® XTR 10410 sold by the company Cray Valley, with a number-average molecular mass (Mn) in the region of 1000 g/mol and the hydroxyl number of which ranges from 108 to 116 mg KOH/g. It is a product resulting from the condensation of adipic acid, diethylene glycol and monoethylene glycol;

the polycaprolactone diols or triols sold by the company Perstorp under the reference CAPA Polyols, having a number-average molecular mass (Mn) ranging from 240 to 8000 g/mol.

The polycarbonate polyols may be chosen from polycarbonate diols or triols, in particular with a number-average molecular mass ($M_n$) ranging from 300 g/mol to 12 000 g/mol.

Examples of polycarbonate diols that may be mentioned include:
Converge Polyol 212-10 and Converge Polyol 212-20 sold by the company Novomer, with respective number-average molecular masses ($M_n$) equal to 1000 and 2000 g/mol, the hydroxyl numbers of which are, respectively, 112 and 56 mg KOH/g,
Desmophen® C XP 2716 sold by Covestro, with a number-average molecular mass ($M_n$) equal to 326 g/mol, and the hydroxyl number of which is 344 mg KOH/g,
Polyol C-590, C1090, C-2090 and C-3090 sold by Kuraray, with a number-average molecular mass ($M_n$) ranging from 500 to 3000 g/mol and a hydroxyl number ranging from 224 to 37 mg KOH/g.

The polyisocyanate(s) that may be used to prepare the prepolymer of the abovementioned formula (IV) may be added sequentially or reacted in the form of a mixture.

According to one embodiment, the polyisocyanate(s) that may be used are diisocyanate(s), preferably chosen from the group consisting of isophorone diisocyanate (IPDI), hexamethylene diisocyanate (HDI), heptane diisocyanate, octane diisocyanate, nonane diisocyanate, decane diisocyanate, undecane diisocyanate, dodecane diisocyanate, 4,4'-methylenebis(cyclohexyl isocyanate) (4,4'-HMDI), norbornane diisocyanate, norbornene diisocyanate, 1,4-cyclohexane diisocyanate (CHDI), methylcyclohexane diisocyanate, ethylcyclohexane diisocyanate, propylcyclohexane diisocyanate, methyldiethylcyclohexane diisocyanate, cyclohexanedimethylene diisocyanate, 1,5-diisocyanato-2-methylpentane (MPDI), 1,6-diisocyanato-2,4,4-trimethylhexane, 1,6-diisocyanato-2,2,4-trimethylhexane (TMDI), 4-isocyanatomethyl-1,8-octane diisocyanate (TIN), (2,5)-bis(isocyanatomethyl)bicyclo[2.2.1]heptane (2,5-NBDI), (2,6)-bis (isocyanatomethyl)bicyclo[2.2.1]heptane (2,6-NBDI), 1,3-bis(isocyanatomethyl)cyclohexane (1,3-H6-XDI), 1,4-bis (isocyanatomethyl)cyclohexane (1,4-H6-XDI), xylylene diisocyanate (XDI) (in particular m-xylylene diisocyanate (m-XDI)), toluene diisocyanate (in particular 2,4-toluene diisocyanate (2,4-TDI) and/or 2,6-toluene diisocyanate (2,6-TDI)), diphenylmethane diisocyanate (in particular 4,4'-diphenylmethane diisocyanate (4,4'-MDI) and/or 2,4'-diphenylmethane diisocyanate (2,4'-MDI)), tetramethylxylylene diisocyanate (TMXDI) (in particular tetramethyl(meta)xylylene diisocyanate), and mixtures thereof.

Preferably, the polyisocyanate(s) are chosen from toluene diisocyanate (in particular the isomer 2,4-TDI, the isomer 2,6-TDI or mixtures thereof), meta-xylylene, IPDI, and mixtures thereof. Preferably, the polyisocyanate is isophorone diisocyanate (IPDI).

The polyisocyanate(s) that may be used are typically widely commercially available. By way of example, mention may be made of Scuranate® TX sold by the company Vencorex, corresponding to a 2,4-TDI having a purity of the order of 95%, Scuranate® T100 sold by the company Vencorex, corresponding to a 2,4-TDI having a purity of greater than 99% by weight, Desmodur® I sold by the company Covestro, corresponding to an IPDI or Desmodur® N3300 sold by the company Covestro, corresponding to an HDI isocyanate, Takenate™ 500 sold by Mitsui Chemicals, corresponding to an m-XDI, Takenate™ 600 sold by Mitsui Chemicals, corresponding to an m-H6XDI, Vestanat® H12MDI sold by Evonik, corresponding to an H12MDI.

Preferably, the polyisocyanate is isophorone diisocyanate (IPDI).

The polyaddition reaction of step E1) may be performed in the presence or absence of at least one reaction catalyst.

The reaction catalyst(s) that may be used during the polyaddition reaction of step E1) may be any catalyst known to those skilled in the art for catalyzing the formation of polyurethane by reaction of at least one polyisocyanate with at least one polyol.

An amount ranging up to 0.3% by weight of catalyst(s), relative to the weight of the reaction medium of step E1), may be used. In particular, it is preferred to use from 0.02% to 0.2% by weight of catalyst(s) relative to the total weight of the reaction medium of step E1).

Step E2)

Step E2) may be performed under anhydrous conditions.

Step E2) may be performed at a temperature ranging from 40° C. to 100° C., preferably from 60° C. to 100° C. and advantageously from 80° C. to 95° C.

The polyaddition reaction of step E2) may be performed in the presence or absence of at least one reaction catalyst.

The reaction catalyst(s) that may be used during the polyaddition reaction of step E2) may be any catalyst known to a person skilled in the art for catalyzing this type of reaction between a hydroxyl compound and an NCO-terminated prepolymer.

An amount ranging up to 0.3% by weight of catalyst(s), relative to the weight of the reaction medium of step E2), may be used. In particular, it is preferred to use from 0.02% to 0.2% by weight of catalyst(s) relative to the total weight of the reaction medium of step E2).

The prepolymer of formula (IV) may comprise a mass content of NCO groups (% NCO) ranging from 0.1% to 15%, preferably from 0.3% to 10%, preferentially from 0.5% to 8% and advantageously from 0.6% to 3% relative to the total mass of said prepolymer.

The present invention notably relates to a polyurethane P' having the formula (V) below:

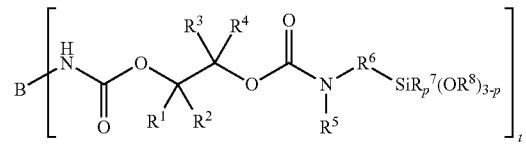

in which:
B represents a multivalent organic radical;
t represents an integer or non-integer number which may range from 2 to 4;
$R^1$, $R^2$, $R^3$ and $R^4$ are each, independently of each other, chosen from the group consisting of: H; a linear or branched alkyl group comprising from 1 to 20 carbon atoms; and a group —C(O)—X—$R^9$ in which:
X represents an oxygen atom or a radical $NR^{10}$;
$R^9$ is chosen from the group consisting of: a linear or branched, aliphatic or cyclic alkyl group comprising from 1 to 60 carbon atoms, preferably from 1 to 20 carbon atoms, preferentially from 1 to 12 carbon atoms, said alkyl group possibly being interrupted with one or more heteroatoms chosen from O and S, said alkyl group possibly comprising one or more unsaturations; an aryl group comprising from 6 to 24 carbon atoms, preferably from 6 to 12 carbon atoms; and an arylalkyl group in which the alkyl group comprises from 1 to 12 carbon atoms;

$R^{10}$ is chosen from the group consisting of: a hydrogen atom, a linear or branched, aliphatic or cyclic alkyl group comprising from 1 to 60 carbon atoms, preferably from 1 to 20 carbon atoms, preferentially from 1 to 12 carbon atoms, said alkyl group possibly being interrupted with one or more heteroatoms chosen from O and S, said alkyl group possibly comprising one or more unsaturations; an aryl group comprising from 6 to 24 carbon atoms, preferably from 6 to 12 carbon atoms; and an arylalkyl group in which the alkyl group comprises from 1 to 12 carbon atoms;

$R^5$ represents a hydrogen atom, a linear or branched, cyclic or aliphatic alkyl radical comprising from 1 to 20 carbon atoms, preferably from 1 to 12 carbon atoms, or a radical —$R^6$—$SiR^7_p(OR^8)_{3-p}$;

$R^6$ represents a linear or branched, cyclic or aliphatic alkylene radical comprising from 1 to 12 carbon atoms, preferably from 1 to 5 carbon atoms;

$R^7$ represents a linear or branched, cyclic or aliphatic alkyl radical comprising from 1 to 12 carbon atoms, preferably from 1 to 5 carbon atoms;

each $R^8$ represents, independently of each other, a linear or branched, cyclic or aliphatic alkyl radical comprising from 1 to 12 carbon atoms, preferably from 1 to 5 carbon atoms; or two radicals $R^8$ may together form a ring comprising from 3 to 12 carbon atoms; and p represents 0, 1 or 2;

on condition that a radical from among the radicals $R^1$, $R^2$, $R^3$ or $R^4$ represents a group —C(O)—X—$R^9$.

Each occurrence of each one from among $R^1$, $R^2$, $R^3$, $R^4$, $R^5$, $R^6$, $R^7$, $R^8$, $R^9$, X, $R^{10}$ and p may be identical or different in each repeating unit. For example, when t=2, there are two repeating units that may be identical or different. For example, when t=3, there are three repeating units that may be identical or different.

The polyurethane P' may be a particular example of the abovementioned polymer P.

The polyurethane P' preferably has the formula (VI) below:

carbon atoms, preferentially from 1 to 12 carbon atoms, said alkyl group possibly being interrupted with one or more heteroatoms chosen from O and S, said alkyl group possibly comprising one or more unsaturations; an aryl group comprising from 6 to 24 carbon atoms, preferably from 6 to 12 carbon atoms; and an arylalkyl group in which the alkyl group comprises from 1 to 12 carbon atoms;

$R^{10}$ is chosen from the group consisting of: a hydrogen atom, a linear or branched, aliphatic or cyclic alkyl group comprising from 1 to 60 carbon atoms, preferably from 1 to 20 carbon atoms, preferentially from 1 to 12 carbon atoms, said alkyl group possibly being interrupted with one or more heteroatoms chosen from O and S, said alkyl group possibly comprising one or more unsaturations; an aryl group comprising from 6 to 24 carbon atoms, preferably from 6 to 12 carbon atoms; and an arylalkyl group in which the alkyl group comprises from 1 to 12 carbon atoms;

$R^5$ represents a hydrogen atom or a linear or branched, cyclic or aliphatic alkyl radical comprising from 1 to 20 carbon atoms, preferably from 1 to 12 carbon atoms;

$R^6$ represents a linear or branched, cyclic or aliphatic alkylene radical comprising from 1 to 12 carbon atoms, preferably from 1 to 5 carbon atoms;

$R^7$ and $R^8$ represent, independently of each other, a linear or branched, cyclic or aliphatic alkyl radical comprising from 1 to 12 carbon atoms, preferably from 1 to 5 carbon atoms; and p represents 0, 1 or 2;

on condition that a radical from among the radicals $R^1$, $R^2$, $R^3$ or $R^4$ represents a group —C(O)—X—$R^9$.

Each occurrence of each one from among $R^1$, $R^2$, $R^3$, $R^4$, $R^5$, $R^6$, $R^7$, $R^8$, $R^9$, X, $R^{10}$ and p may be identical or different.

The term "each occurrence of each one from among $R^1$, $R^2$, $R^3$, $R^4$, $R^5$, $R^6$, $R^7$, $R^8$, $R^9$, X, $R^{10}$ and p may be identical or different" means, for example, that each occurrence of $R^1$ in formula (VI) may be identical or different, or that each occurrence of p may be identical or different in formula (VI). This is likewise the case for all the radicals mentioned. For

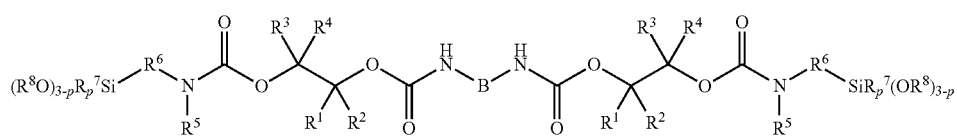

in which:

$R^1$, $R^2$, $R^3$ and $R^4$ are each, independently of each other, chosen from the group consisting of: H; a linear or branched alkyl group comprising from 1 to 20 carbon atoms; and a group —C(O)—X—$R^9$ in which:

X represents an oxygen atom or a radical $NR^{10}$;

$R^9$ is chosen from the group consisting of: a linear or branched, aliphatic or cyclic alkyl group comprising from 1 to 60 carbon atoms, preferably from 1 to 20 example, one radical $R^1$ of formula (VI) may represent H, whereas the other radical $R^1$ may represent a radical —C(O) $XR^9$.

According to one embodiment, in formula (VI) above, each occurrence of each one from among $R^5$, $R^6$, $R^7$, $R^8$, $R^9$, X, $R^{10}$ and p is identical, and each occurrence of each radical from among $R^1$, $R^2$, $R^3$ and $R^4$ may be identical or different.

The polyurethane P' according to the invention preferably has one of the formulae (VII), (VIII) or (IX) below:

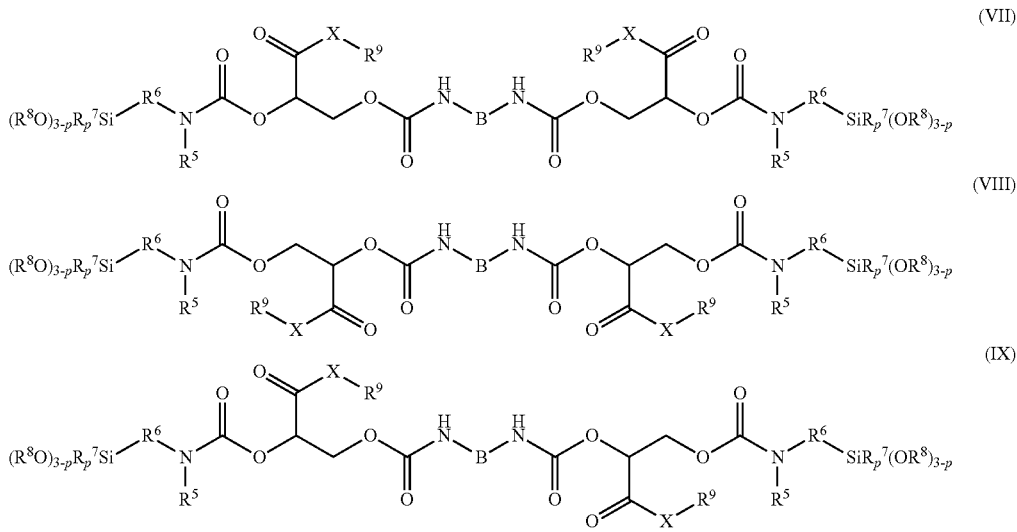

in which $R^5$, $R^6$, $R^7$, $R^8$, $R^9$, X and p are as defined previously.

According to one embodiment, the polyurethanes P' of formulae (V), (VI), (VII), (VIII) and (IX) are those for which:
- p=0; and/or
- $R^8$=methyl; and/or
- $R^6$=propylene; and/or
- $R^5$=H or butyl.

In particular, the polyurethanes P' of formulae (V), (VI), (VII), (VIII) and (IX) are those for which:
- p=0; and
- $R^8$=methyl; and
- $R^6$=propylene; and
- $R^5$=H or butyl.

Preferably, in the polyurethanes P' of formulae (V), (VI), (VII), (VIII) and (IX), the group $R^9$ represents:
- a linear alkyl group comprising from 1 to 12 carbon atoms, preferably from 1 to 5 carbon atoms, preferentially a butyl group; or
- a branched alkyl group comprising from 1 to 12 carbon atoms, preferably from 5 to 12 carbon atoms, preferably a —$CH_2$—CH($CH_2CH_3$)—$(CH_2)_3$—$CH_3$ group; or
- a group of formula —(CH(Me)-$CH_2$—O)$_n$—$(CH_2)_n$—$CH_3$, in which m and n each represent an integer ranging from 1 to 5, preferably 1, 2 or 3.

According to one embodiment, in the polyurethanes P' of formulae (V), (VI), (VII), (VIII) and (IX), the group $R^{10}$ represents a linear or branched, aliphatic or cyclic alkyl group comprising from 1 to 60 carbon atoms, preferably from 1 to 20 carbon atoms, preferentially from 1 to 12 carbon atoms, said alkyl group possibly being interrupted with one or more heteroatoms chosen from O and S, said alkyl group possibly comprising one or more unsaturations.

Preferably, the group $R^{10}$ represents a linear alkyl radical comprising from 1 to 12 carbon atoms, preferentially from 1 to 5 carbon atoms, the group $R^{10}$ advantageously being a methyl.

The present invention also relates to the use of the abovementioned polyurethanes (P and P') for the preparation of adhesives, mastics or coatings.

The silyl polyurethanes according to the invention advantageously have a lower viscosity than the existing silyl polymers, which makes them easier to handle and to use.

E. Polymer Compositions

The present invention relates to a composition V comprising at least two, preferably at least three, polyurethanes P (or P') according to the invention.

Composition V may have a Brookfield viscosity measured at 100° C. ranging from 100 to 3000 mPa·s.

Preferably, composition V comprises:
- a polyurethane P' of formula (VII) as defined above;
- a polyurethane P' of formula (VIII) as defined above; and
- a polyurethane P' of formula (IX) as defined above;
- each occurrence of each one from among $R^5$, $R^6$, $R^7$, $R^8$, $R^9$, X, $R^{10}$ and p preferably being identical.

F. Formulations

The present invention relates to a formulation comprising at least one polyurethane P or P' according to the invention, and at least one additive chosen from the group consisting of catalysts, fillers, antioxidants, light stabilizers/UV absorbers, metal deactivators, antistatics, foaming agents, biocides, plasticizers, lubricants, emulsifiers, dyes, pigments, rheological agents, impact modifiers, adhesion promoters, optical brighteners, flame retardants, anti-sweating agents, nucleating agents, solvents, reactive diluents and mixtures thereof.

The abovementioned formulation advantageously comprises:
- a polyurethane P' of formula (VII) as defined above;
- a polyurethane P' of formula (VIII) as defined above; and
- a polyurethane P' of formula (IX) as defined above;
- each occurrence of each one from among $R^5$, $R^6$, $R^7$, $R^8$, $R^9$, X, $R^{10}$ and p preferably being identical.

The fillers usually used are, for example, inorganic or organic powders, for example calcium carbonates and silicates, and inorganic fibrous materials, for example glass fibers. It is also possible to use organic fillers such as carbon fibers, mixtures of organic and inorganic fillers, for example mixtures of glass fibers and of carbon fibers or mixtures of carbon fibers and of inorganic fillers. The fillers may be added in an amount ranging from 1% to 75% by weight, relative to the total weight of the formulation.

The UV stabilizers, the antioxidants and the metal deactivators used in the formulations according to the invention advantageously have good migration resistance and high thermal stability. They are chosen, for example, from the following groups a) to t). The compounds of groups a) to g) and i) are light stabilizers/UV absorbers, whereas compounds j) to t) act as stabilizers:

a) 4,4-diarylbutadienes
b) cinnamic esters,
c) benzotriazoles,
d) hydroxybenzophenones,
e) diphenyl cyanoacrylates,
f) oxamides,
g) 2-phenyl-1,3,5-triazines,
h) antioxidants,
i) nickel derivatives,
j) sterically hindered amines,
k) metal deactivators,
l) phosphites and phosphonites,
m) hydroxylamines,
n) nitrones,
o) amine oxides,
p) benzofuranones and indolinones,
q) thiosynergists,
r) peroxide destroyers,
s) polyamide stabilizers and
t) basic co-stabilizers.

The catalysts are optionally used in proportions ranging from 0.01% to about 10% by weight, relative to the total weight of the formulation.

The catalyst may be chosen from:
organotitanium derivatives, for instance titanium acetylacetonate (commercially available under the name Tyzor® AA75 from the company DuPont), Ti(OnBu)$_4$ (commercially available under the name Tyzor® TnBT from DORF Ketal);
organoaluminum derivatives, for instance aluminum chelate (commercially available under the name K-KAT® 5218 from the company King Industries);
organozinc derivatives, for instance Zn[O(C=O)C$_9$H$_{19}$]$_2$ (available from the company OMG Borchers under the trade name Borchi® KAT 15);
organobismuth derivatives, for instance Bi[O(C=O) C$_9$H$_9$]$_2$ (available from the company OMG Borchers under the trade name Borchi® KAT 315);
organotin derivatives, for instance dibutyltin dilaurate (or DBTL), dibutyltin dilaurate (DOTDL), dioctyltin bisacetylacetonate (available under the name TIB KAT® 223) or TIB KAT® 425 (which is a mixture of dioctyltin oxide and vinyltrimethoxysilane);
organic amines: preference is given to amidines, for example 1,8-diazabicyclo[5.4.0]undec-7-ene (DBU) and 1,5-diazabicyclo[4.3.0]non-5-ene (DBN), 1,5,7-triazabicyclo[4.4.0]dec-5-ene (TBD), di-o-tolylguanidine (DOTG), and C1 to C6 mono-, di- and trialkylamines, in particular triethylamine and tert-butylamine.

The choice of the additives used advantageously depends on the final use made of the formulation according to the invention, which may be adjusted as a function of the application specifications by a person skilled in the art.

The solvents may be organic solvents, chosen, for example, from aprotic solvents, protic solvents and mixtures thereof.

The present invention also relates to the use of the abovementioned formulation for the preparation of adhesives, mastics or coatings.

All the embodiments described above may be combined with each other.

In the context of the invention, the term "between x and y" or "ranging from x to y" means a range in which the limits x and y are included. For example, the range "between 0% and 25%" notably includes the values 0% and 25%.

The invention is now described in the following implementation examples, which are given purely by way of illustration and should not be interpreted in order to limit the scope thereof.

EXAMPLES

Suppliers:
Silquest A-1110: 3-aminopropyltrimethoxysilane sold by Momentive;
Dynasylan 1189: N-(n-butyl)-3-aminopropyltrimethoxysilane sold by Evonik;
Butyl 2-oxo-1,3-dioxolane-4-carboxylate (compound of formula (IIIa)), 2-ethylhexyl 2-oxo-1,3-dioxolane-4-carboxylate (compound of formula (IIIb)) and 2-(2-butoxypropoxy)propyl 2-oxo-1,3-dioxolane-4-carboxylate (compound of formula (IIIc)) were synthesized according to the method described in WO 2012/065879 or WO 2011/157551. N-Methyl-N-butyl (2-oxo-1,3-dioxolane-4-carboxylamide (compound of formula (IIId)) was synthesized as described in WO 2013/092011.

Example 1

2.0 mol of butyl 2-oxo-1,3-dioxolane-4-carboxylate (376.3 g) of formula (IIIa) are placed in 300 ml of dry THF in a 2 liter reactor, followed by addition at room temperature of 2.1 mol of 3-aminopropyltrimethoxysilane (376.5 g) at room temperature, up to the point of complete disappearance of the infrared band characteristic of the 2-oxo-1,3-dioxolan-4-yl groups (C=O band at 1740 cm$^{-1}$ in infrared) and the appearance of the bands characteristic of the carbamate functions (C=O band at 1780 cm$^{-1}$ in infrared).

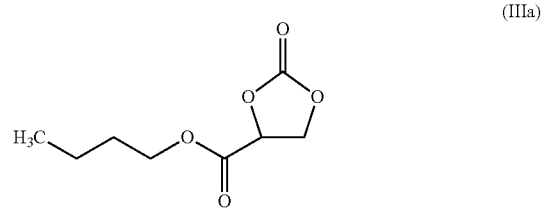

(IIIa)

The THF is then removed under reduced pressure to obtain quantitatively the mixture of the two products having the following formulae:

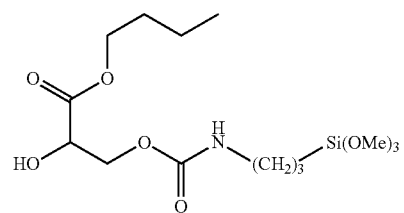

-continued

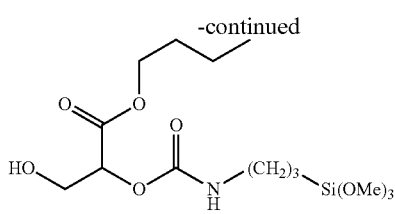

Example 2

Example 1 was repeated, replacing the compound of formula (IIIa) with 2-ethylhexyl 2-oxo-1,3-dioxolane-4-carboxylate (488.3 g) of formula (IIIb):

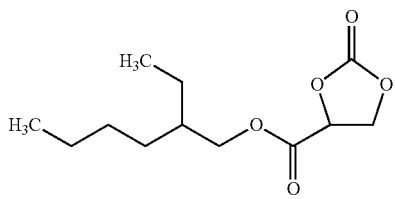
(IIIb)

The mixture of the following two products is obtained quantitatively:

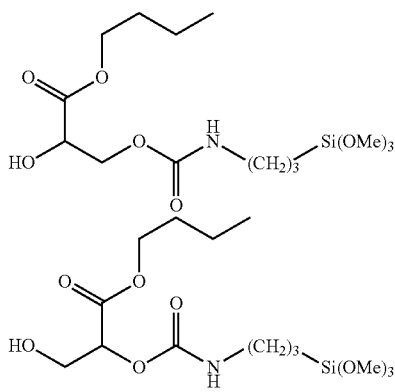

Example 3

Example 1 was repeated, replacing the compound of formula (IIIa) with 2-(2-butoxypropoxy)propyl 2-oxo-1,3-dioxolane-4-carboxylate (608.76 g) of formula (IIIc) (n=2):

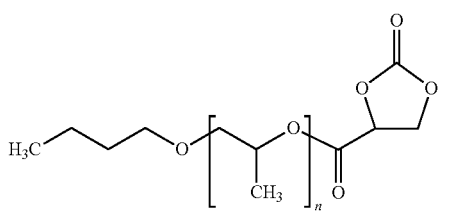
(IIIc, with n = 2)

The mixture of the following two products is obtained quantitatively:

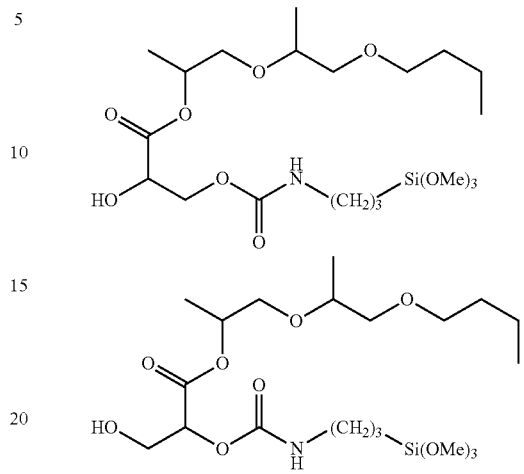

Example 4

2.0 mol of butyl 2-oxo-1,3-dioxolane-4-carboxylate (376.3 g) of formula (IIIa) were placed in 300 ml of dry THF in a 2 liter reactor, and 2.1 mol of N-(n-butyl)-3-aminopropyltrimethoxysilane (494.3 g) were then added at room temperature. The mixture was kept stirring at 50° C. up to the point of total disappearance of the infrared band characteristic of the 2-oxo-1,3-dioxolan-4-yl groups.

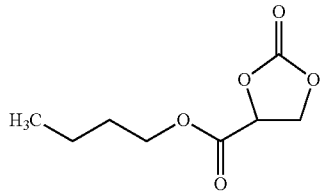
(IIIa)

The THF was then removed under reduced pressure to obtain quantitatively the following products:

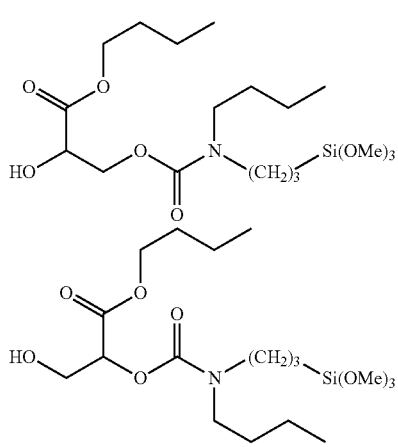

Example 5

Example 1 was repeated, replacing the butyl 2-oxo-1,3-dioxolane-4-carboxylate of formula (IIIa) with N-methyl-N-butyl (2-oxo-1,3-dioxolane-4-carboxylamide (402.3 g) of formula (IIId).

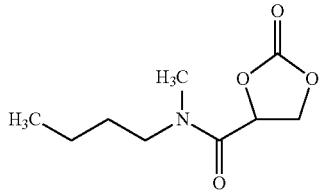

(IIId)

The mixture of the following two products is obtained quantitatively:

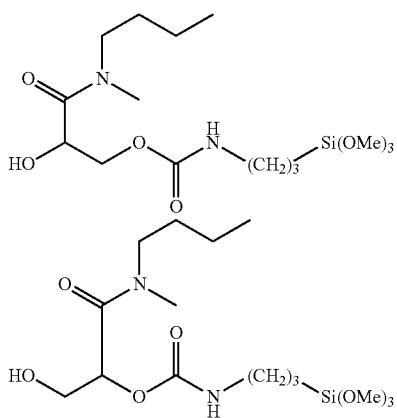

Example 6: Preparation of the NCO-Terminated Prepolymer (P0)

683.5 g of Acclaim 12200 (PPG available from Covestro, having an 1OH=11.0 mg KOH/g or an Mn=11 200 g/mol) were placed in a 2 liter reactor. The reaction medium was left under vacuum for 2 hours at 110° C. (water content 0.02% by weight). The reactor was then cooled to 70° C. so as to introduce, under nitrogen, 46.6 g of isophorone diisocyanate (IPDI) and 0.4 g of Borchi KAT 315 (bismuth neodecanoate available from OMG Borchers). The mixture was kept stirring until an NCO weight percentage of 1.7% is reached, i.e. 0.40 meq. NCO/g. 730.1 g of NCO-terminated polyurethane prepolymer (P0) are obtained.

Example 7: Preparation of Silyl Polymer 237.6 g (0.096 mol or 96 meq. NCO) of prepolymer (P0), 36.7 g of the mixture of example 1 (0.1 mol) in an OH/NCO mole ratio=1.04, and 0.1 g of TIB KAT 223 (dioctyltin bis(acetylacetonate) available from TIB Chemicals) are placed under nitrogen in a 2 L reactor. The mixture was heated to 90° C. and stirred until the band characteristic of the —NCO functions was no longer detectable by infrared spectroscopy. 273.2 g of silyl polyurethanes were obtained, which product was packaged in aluminum cartridges protected from moisture. The Brookfield viscosity of the mixture obtained is 1520 mPa·s at 100° C.

Example 8: Preparation of Silyl Polymer 237.6 g (0.096 mol or 96 meq. NCO) of prepolymer (P0), 42.4 g of the mixture of example 2 (0.1 mol) in an OH/NCO mole ratio=1.04, and 0.1 g of TIB KAT 223 (dioctyltin bis(acetylacetonate) available from TIB Chemicals) are placed under nitrogen in a 2 L reactor. The mixture was heated to 90° C. and stirred until the band characteristic of the —NCO functions was no longer detectable by infrared spectroscopy. 276.2 g of silyl polyurethanes are obtained, which product is packaged in aluminum cartridges protected from moisture. The Brookfield viscosity of the mixture obtained is 1300 mPa·s at 100° C.

Example 9: Preparation of Silyl Polymer 237.6 g (0.096 mol or 96 meq. NCO) of prepolymer (P0), 48.4 g of the mixture of example 3 (0.1 mol) in an OH/NCO mole ratio=1.04, and 0.1 g of TIB KAT 223 (dioctyltin bis(acetylacetonate) available from TIB Chemicals) are placed under nitrogen in a 2 L reactor. The mixture was heated to 90° C. and stirred until the band characteristic of the —NCO functions was no longer detectable by infrared spectroscopy. 287.8 g of silyl polyurethanes (SPUR 3) are obtained, which product is packaged in aluminum cartridges protected from moisture. The viscosity of the mixture obtained is 1260 mPa·s at 100° C.

Example 10: Preparation of Silyl Polymer 237.6 g (0.096 mol or 96 meq. NCO) of prepolymer (P0), 42.4 g of the mixture obtained in example 4 (0.1 mol) in an OH/NCO mole ratio=1.04, and 0.1 g of TIB KAT 223 (dioctyltin bis(acetylacetonate) available from TIB Chemicals) are placed under nitrogen in a 2 L reactor. The mixture was heated to 90° C. and stirred until the band characteristic of the —NCO functions was no longer detectable by infrared spectroscopy. 287.8 g of silyl polyurethanes are obtained, which product is packaged in aluminum cartridges protected from moisture. The viscosity of the mixture obtained is 1390 mPa·s at 100° C.

Example 11: Preparation of Silyl Polymer 237.6 g (0.096 mol or 96 meq. NCO) of prepolymer (P0), 38.0 g of the mixture obtained in example 4 (0.1 mol) in an OH/NCO mole ratio=1.04, and 0.1 g of TIB KAT 223 (dioctyltin bis(acetylacetonate) available from TIB Chemicals) are placed under nitrogen in a 2 L reactor. The mixture was heated to 90° C. and stirred until the band characteristic of the —NCO functions was no longer detectable by infrared spectroscopy. 287.8 g of silyl polyurethanes are obtained, which product is packaged in aluminum cartridges protected from moisture. The viscosity of the mixture obtained is 1420 mPa·s at 100° C.

Example 12: Preparation of Comparative Silyl Polymer 237.6 g (0.096 mol or 96 meq. NCO) of prepolymer (P0) and 17.9 g (0.1 mol or 100 meq. NH2) of 3-aminopropyltrimethoxysilane (Silquest A-1110 from Momentive) in an NH2/NCO mole ratio=1.04 are introduced under nitrogen into a 2 L reactor. The mixture is heated to 70° C. and stirred until the band characteristic of the —NCO functions is no longer detectable by infrared spectroscopy. 255.5 g of silyl polyurethane are obtained, which product is packaged in aluminum cartridges protected from moisture. The viscosity of the silyl polyurethane obtained is 5500 mPa·s at 100° C.

Thus, the viscosity of the silyl polymers of examples 7 to 11 advantageously have a lower viscosity than that of the silyl polymer of example 12 (comparative) (at 100° C.), which notably allows easier handling and use. In addition, a lower viscosity advantageously makes it possible to avoid the additional use of plasticizer in the formulations.

The invention claimed is:

1. A compound of formula (I):

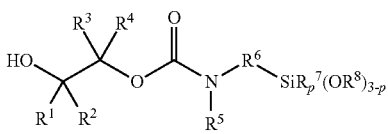

(I)

wherein:
- $R^1$, $R^2$, $R^3$ and $R^4$ are each, independently of each other, chosen from the group consisting of: H; a linear or branched alkyl group comprising from 1 to 20 carbon atoms; and a group —C(O)—X—$R^9$ wherein:
  - X represents an oxygen atom or a radical $NR^{10}$;
  - $R^9$ is chosen from the group consisting of a linear or branched, aliphatic or cyclic alkyl group comprising from 1 to 60 carbon atoms, said alkyl group possibly being interrupted with one or more heteroatoms chosen from O and S, said alkyl group possibly comprising one or more unsaturations; an aryl group comprising from 6 to 24 carbon atoms; and an arylalkyl group in which the alkyl group comprises from 1 to 12 carbon atoms;
  - $R^{10}$ is chosen from the group consisting of: a hydrogen atom, a linear or branched, aliphatic or cyclic alkyl group comprising from 1 to 60 carbon atoms, said alkyl group possibly being interrupted with one or more heteroatoms chosen from O and S, said alkyl group possibly comprising one or more unsaturations; an aryl group comprising from 6 to 24 carbon atoms; and an arylalkyl group in which the alkyl group comprises from 1 to 12 carbon atoms;
- $R^5$ represents a hydrogen atom, a linear or branched, cyclic or aliphatic alkyl radical comprising from 1 to 20 carbon atoms, or a radical —$R^6$—$SiR^7_p(OR^8)_{3-p}$;
- $R^6$ represents a linear or branched, cyclic or aliphatic alkylene radical comprising from 1 to 12 carbon atoms;
- $R^7$ represents a linear or branched, cyclic or aliphatic alkyl radical comprising from 1 to 12 carbon atoms;
- each $R^8$ represents, independently of each other, a linear or branched, cyclic or aliphatic alkyl radical comprising from 1 to 12 carbon atoms; or two radicals $R^8$ may together form a ring comprising from 3 to 12 carbon atoms; and
- p represents 0, 1 or 2;
wherein a radical from among the radicals $R^1$, $R^2$, $R^3$ or $R^4$ represents a group —C(O)—X—$R^9$.

2. The compound as claimed in claim 1, having the formula (I-1) below:

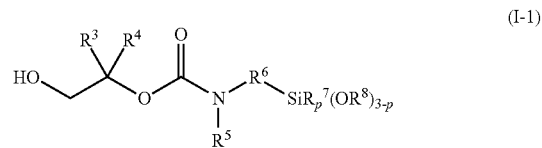

(I-1)

wherein $R^3$, $R^4$, $R^5$, $R^6$, $R^7$, $R^8$ and p are as defined in claim 1, a radical from among $R^3$ and $R^4$ representing a group —C(O)—X—$R^9$, X and $R^9$ being as defined in claim 1.

3. The compound as claimed in claim 2, wherein the compound is selected from the group consisting of:
compounds of formula (I-1-A) wherein a radical from among $R^3$ and $R^4$ represents a group —C(O)—O—$R^9$; and
compounds of formula (I-1-B) wherein a radical from among $R^3$ and $R^4$ represents a group —C(O)—N($R^{10}$)$R^9$.

4. The compound as claimed in claim 1, having the formula (I-2) below:

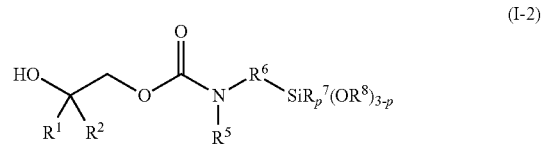

(I-2)

wherein $R^1$, $R^2$, $R^5$, $R^6$, $R^7$, $R^8$ and p are as defined in claim 1, a radical from among $R^1$ and $R^2$ representing a group —C(O)—X—$R^9$, X and $R^9$ being as defined in claim 1.

5. The compound as claimed in claim 4, wherein the compound is selected from the group consisting of:
compounds of formula (I-2-A) wherein a radical from among $R^1$ and $R^2$ represents a group —C(O)—O—$R^9$; and
compounds of formula (I-2-B) wherein a radical from among $R^1$ and $R^2$ represents a group —C(O)—N($R^{10}$)$R^9$.

6. The compound as claimed in claim 1, having the formula (I-3) below:

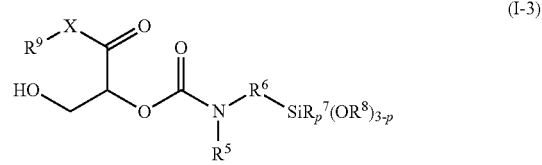

(I-3)

wherein $R^5$, $R^6$, $R^7$, $R^8$, X, $R^9$ and p are as defined in claim 1.

7. The compound as claimed in claim 1, having the formula (I-4) below:

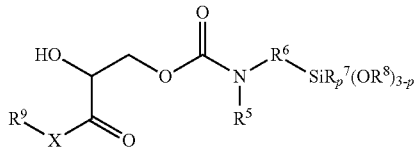

(I-4)

wherein $R^5$, $R^6$, $R^7$, $R^8$, X, $R^9$ and p are as defined in claim 1.

8. The compound as claimed in claim 1, wherein:

p=0; and/or $R^8$=methyl; and/or $R^6$=propylene; and/or $R^5$=H or butyl.

9. The compound as claimed in claim 1, wherein $R^9$ represents a linear or branched, aliphatic or cyclic alkyl group comprising from 1 to 60 carbon atoms, said alkyl group possibly being interrupted with one or more heteroatoms chosen from O and S, said alkyl group possibly comprising one or more unsaturations.

10. The compound as claimed in claim 1, wherein $R^{10}$ represents a linear or branched, aliphatic or cyclic alkyl group comprising from 1 to 60 carbon atoms, said alkyl group possibly being interrupted with one or more heteroatoms chosen from O and S, said alkyl group possibly comprising one or more unsaturations.

11. The compound as claimed in claim 1, selected from the group consisting of the following compounds:

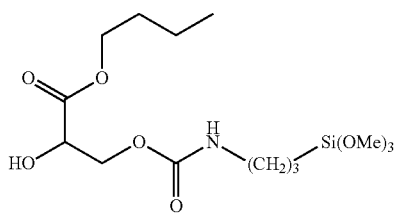

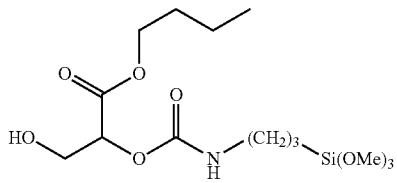

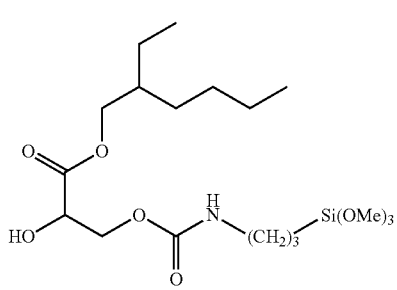

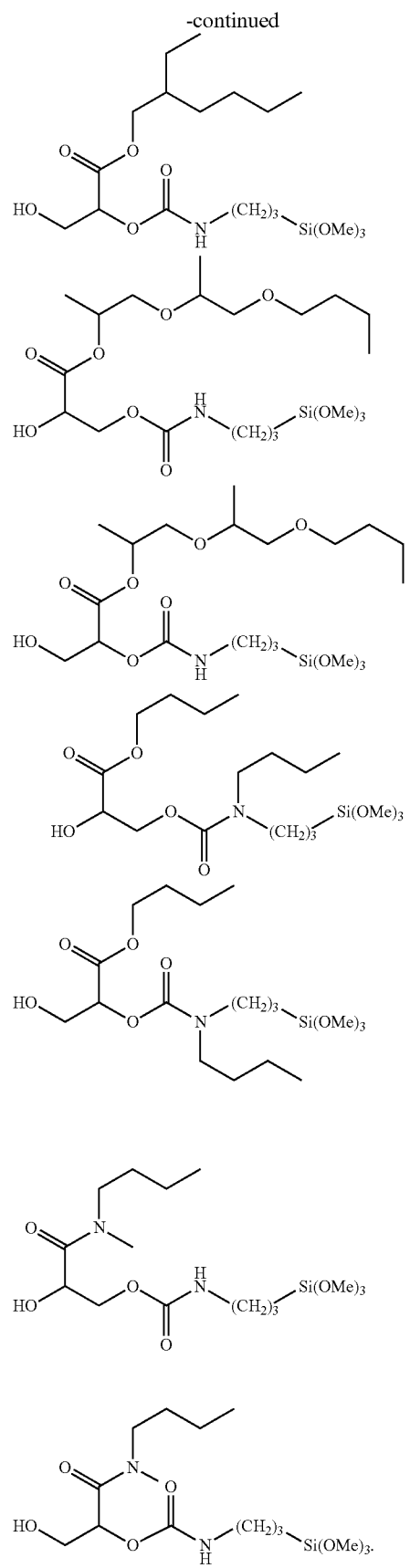

12. A process for preparing the compound of formula (I) as defined in claim 1, comprising reacting a compound of formula (II) with a compound of formula (III), wherein formula (II) is defined as:

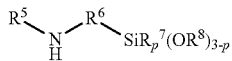
(II)

wherein $R^5$, $R^6$, $R^7$, $R^8$ and p are as defined in claim 1; and formula (III) is defined as:

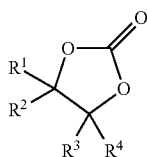
(III)

wherein $R^1$, $R^2$, $R^3$ and $R^4$ areas defined in claim 1, a radical from among the radicals $R^1$, $R^2$, $R^3$ and $R^4$ representing a group —C(O)—X—$R^9$ with X and $R^9$ being as defined in claim 1.

13. A composition C comprising two different compounds of formula (I) as defined in claim 1.

14. The composition C as claimed in claim 13, comprising:

a compound of formula (I-3):

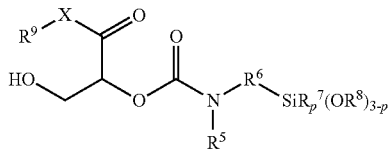
(I-3)

and
a compound of formula (I-4):

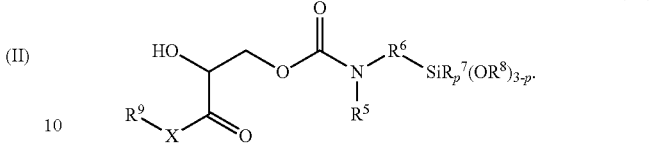
(I-4)

15. A process for manufacturing a polyurethane P comprising reacting:
at least one compound(s) of formula (I) as defined in claim 1, and
a prepolymer of formula (IV) below:

(IV), wherein t represents an integer or non-integer number ranging from 2 to 4, and B represents a multivalent organic radical.

16. The process of claim 15, further comprising:
E1) the preparation of a polyurethane prepolymer bearing —NCO end groups of formula (IV) as defined in claim 15, via a polyaddition reaction:
iii) of at least one polyisocyanate;
iv) with at least one polyol;
in amounts such that the NCO/OH mole ratio (r1) is strictly greater than 1; and
E2) reaction of the product formed on conclusion of step E1) with at least one, compound(s) of formula (I), in amounts such that the NCO/OH mole ratio (r2) is between 1.3 and 5.

17. A polyurethane P' having the formula (V) below:

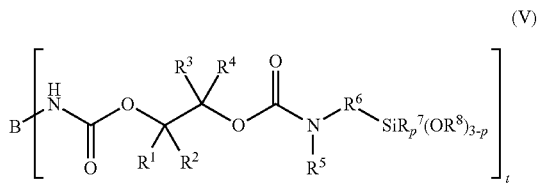
(V)

wherein:
t represents an integer or non-integer number ranging from 2 to 4, and B represents a multivalent organic radical; and
$R^1$, $R^2$, $R^3$, $R^4$, $R^9$, $R^5$, $R^6$, $R^7$, $R^8$, $R^9$, X and p are as defined in claim 1.

18. The polyurethane P' as claimed in claim 17, having one of the formulae (VII), (VIII) or (IX) below:

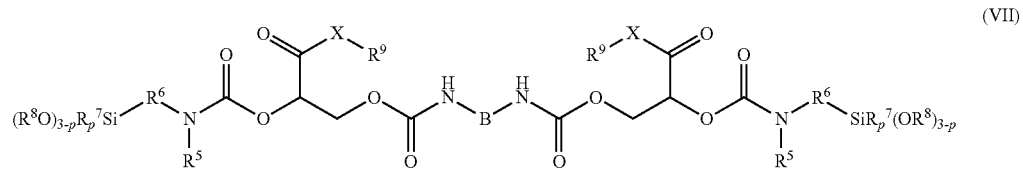
(VII)

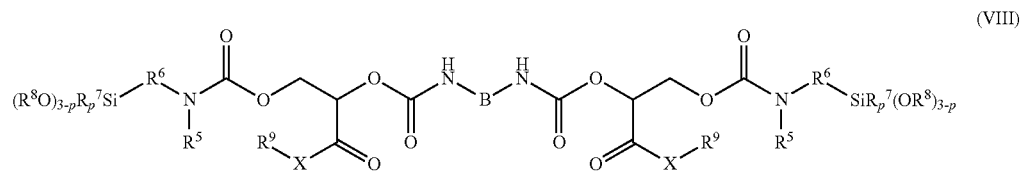
(VIII)

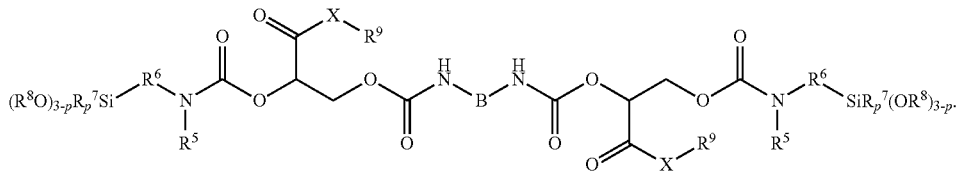

(IX)

19. A formulation comprising at least one polyurethane P as claimed in claim 15 and at least one additive chosen from the group consisting of catalysts, fillers, antioxidants, light stabilizers/UV absorbers, metal deactivators, antistatics, foaming agents, biocides, plasticizers, lubricants, emulsifiers, dyes, pigments, rheological agents, impact modifiers, adhesion promoters, optical brighteners, flame retardants, anti-sweating agents, nucleating agents, solvents, reactive diluents and mixtures thereof.

20. A formulation comprising at least one polyurethane P' as claimed in claim 17 and at least one additive chosen from the group consisting of catalysts, fillers, antioxidants, light stabilizers/UV absorbers, metal deactivators, antistatics, foaming agents, biocides, plasticizers, lubricants, emulsifiers, dyes, pigments, rheological agents, impact modifiers, adhesion promoters, optical brighteners, flame retardants, anti-sweating agents, nucleating agents, solvents, reactive diluents and mixtures thereof.

* * * * *